US006997055B2

(12) United States Patent
DiFoggio

(10) Patent No.: US 6,997,055 B2
(45) Date of Patent: Feb. 14, 2006

(54) SYSTEM AND METHOD FOR DETERMINING FORMATION FLUID PARAMETERS USING REFRACTIVE INDEX

(75) Inventor: Rocco DiFoggio, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/854,474

(22) Filed: May 26, 2004

(65) Prior Publication Data

US 2005/0262936 A1    Dec. 1, 2005

(51) Int. Cl.
   *E21B 47/10*   (2006.01)
(52) U.S. Cl. .................................................. 73/512.18
(58) Field of Classification Search ............ 73/152.18, 73/152.22, 152.24, 152.55, 152.51, 152.46; 250/253, 255; 166/256
   See application file for complete search history.

(56) References Cited

U.S. PATENT DOCUMENTS

| | | | | |
|---|---|---|---|---|
| 5,377,755 | A |   | 1/1995 | Michaels et al. ............ 166/264 |
| 5,708,204 | A |   | 1/1998 | Kasap ....................... 73/152.52 |
| 5,803,186 | A |   | 9/1998 | Berger et al. ................. 175/50 |
| 5,831,743 | A | * | 11/1998 | Ramos et al. ................ 356/445 |
| 6,023,340 | A | * | 2/2000 | Wu et al. .................... 356/432 |
| 6,568,487 | B2 |   | 5/2003 | Meister et al. ................. 175/50 |
| 6,585,045 | B2 |   | 7/2003 | Lee et al. ................. 166/252.5 |
| 6,683,681 | B2 |   | 1/2004 | DiFoggio et al. ........... 356/128 |
| 6,891,606 | B2 | * | 5/2005 | Smith et al. ................... 356/70 |
| 2003/0033866 | A1 | * | 2/2003 | Diakonov et al. ........ 73/152.55 |
| 2003/0071988 | A1 | * | 4/2003 | Smith et al. ................. 356/128 |
| 2004/0007665 | A1 |   | 1/2004 | DiFoggio et al. ......... 250/269.1 |

* cited by examiner

*Primary Examiner*—Hezron Williams
*Assistant Examiner*—Tamiko Bellamy
(74) *Attorney, Agent, or Firm*—Madan, Mossman & Sriram, P.C.

(57) ABSTRACT

A method and apparatus is described for determining a parameter of interest of a formation fluid. The method comprises moving a tool attached to a tubular member along a borehole in a subterranean formation. The tool is used to determine the refractive index, pressure and temperature of a formation fluid sample, in situ, at a predetermined location along the borehole. A refractive index of a reference fluid is calculated at the sample conditions. The parameter of interest of the formation fluid is determined at the predetermined location from a comparison of the corresponding formation fluid refractive index and the reference fluid refractive index at the predetermined location. In another embodiment, the refractive index of a natural gas sample is determined and compared to the refractive index of pure methane, at downhole conditions, to indicate the dryness of the natural gas.

18 Claims, 7 Drawing Sheets

US 6,997,055 B2

SYSTEM AND METHOD FOR DETERMINING FORMATION FLUID PARAMETERS USING REFRACTIVE INDEX

BACKGROUND OF THE INVENTION

1. Field of the Invention

This invention relates to the testing of underground formations or reservoirs. More particularly, this invention relates to an apparatus and a method for determining properties of formation fluids by detecting and interpreting the refractive index of the formation fluid.

2. Description of the Related Art

Oil and gas companies spend large sums of money in their attempts to find hydrocarbon deposits. They drill exploration wells in their most promising prospects and use these exploration wells not only to determine whether hydrocarbons are present but also to determine the properties of those hydrocarbons, which are present.

For deep offshore fields, before any hydrocarbons can be produced, it is first necessary to spend several years building very expensive platforms with proper oil and gas handling facilities. The design specifications and cost of materials used in these facilities are strongly dependent on the properties of the hydrocarbons, such as gas to oil ratio, viscosity, bubble point pressure, asphaltene precipitation pressure, and so on.

To determine hydrocarbon properties, oil and gas companies often withdraw some hydrocarbons from the exploration well. Wireline formation testers, such as the Baker Atlas Reservoir Characterization Instrument (RCI) can be lowered into the well for this purpose. Initially, fluids that are withdrawn may be highly contaminated by filtrates of the fluids ("muds") that were used during drilling. To obtain samples that are sufficiently clean (usually <10% contamination) so that the sample will provide meaningful lab data concerning the formation, formation fluids are generally pumped from the wellbore for 30–90 minutes, while clean up is being monitored in real time. Then, these withdrawn fluids can be collected downhole in tanks for subsequent analysis in a laboratory at the surface.

Alternatively, for some properties, samples can be analyzed downhole in real time. Such measurements may be made by sensors in the formation test tool. The formation test tool may be a wireline tool, or a measurement-while-drilling tool. Such sensors may measure properties of the formation fluid, such as for example formation fluid resistivity.

Well logging operations, either by wireline or while drilling, are used to determine properties of the formation fluids, in order to determine the potential hydrocarbon content and the locations of formation water and gas interfaces. These formations may have highly saline brine content. When interpreting deep-reading electric well logs, it is important to know the formation brine resistivity, which is a function of the brine salinity. Sensors used for measuring the fluid resistivity in such tools are commonly limited in their useable sensor range. Some of the highly saline brines encountered have resistivity readings that are beyond the common calibration range of such sensors.

The present invention overcomes these problems by providing an optical apparatus and method for determining brine resistivity from measurement of the brine refractive index.

SUMMARY OF THE INVENTION

In one aspect of the present invention, a method for determining a parameter of interest of a formation fluid, comprises moving a tool attached to a tubular member along a borehole in a subterranean formation. The tool is used to determine a formation fluid refractive index, a formation fluid pressure and a formation fluid temperature at a predetermined location along the borehole. A refractive index of a reference fluid is calculated that is related to the formation fluid pressure and the formation fluid temperature at the predetermined location. The parameter of interest of the formation fluid is determined at the predetermined location from a comparison of the corresponding formation fluid refractive index and the reference fluid refractive index at the predetermined location.

In another aspect, a system for determining a formation fluid parameter of interest comprises a tool attached to a tubular member in a borehole. The tool is adapted to determine a formation fluid refractive index, a formation fluid pressure and a formation fluid temperature at a predetermined location along the borehole. A controller acts under programmed instructions and a model of a reference fluid stored in the controller for determining a reference fluid refractive index at a predetermined location in the borehole. An empirical correlation is stored in the controller and relates the formation parameter of interest to a comparison of the formation fluid refractive index to the reference fluid refractive index.

Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals, wherein.

DETAILED DESCRIPTION

The system and methods of the present invention overcome the foregoing disadvantages of the prior art by determining formation fluid density from refractive index measurements and relating the refractive index to desired formation fluid parameters of interest. The optical system of the present invention may be incorporated in wireline formation testers and in measurement while drilling formation testing systems. Examples of such systems are described in U.S. Pat. No. 5,377,755 A, U.S. Pat. No. 5,708,204 A, U.S. Pat. No. 5,803,186 A, U.S. Pat. No. 6,568,487 B2, U.S. Pat. No. 6,585,045 B2, each of which is incorporated herein by reference.

Figure 1:
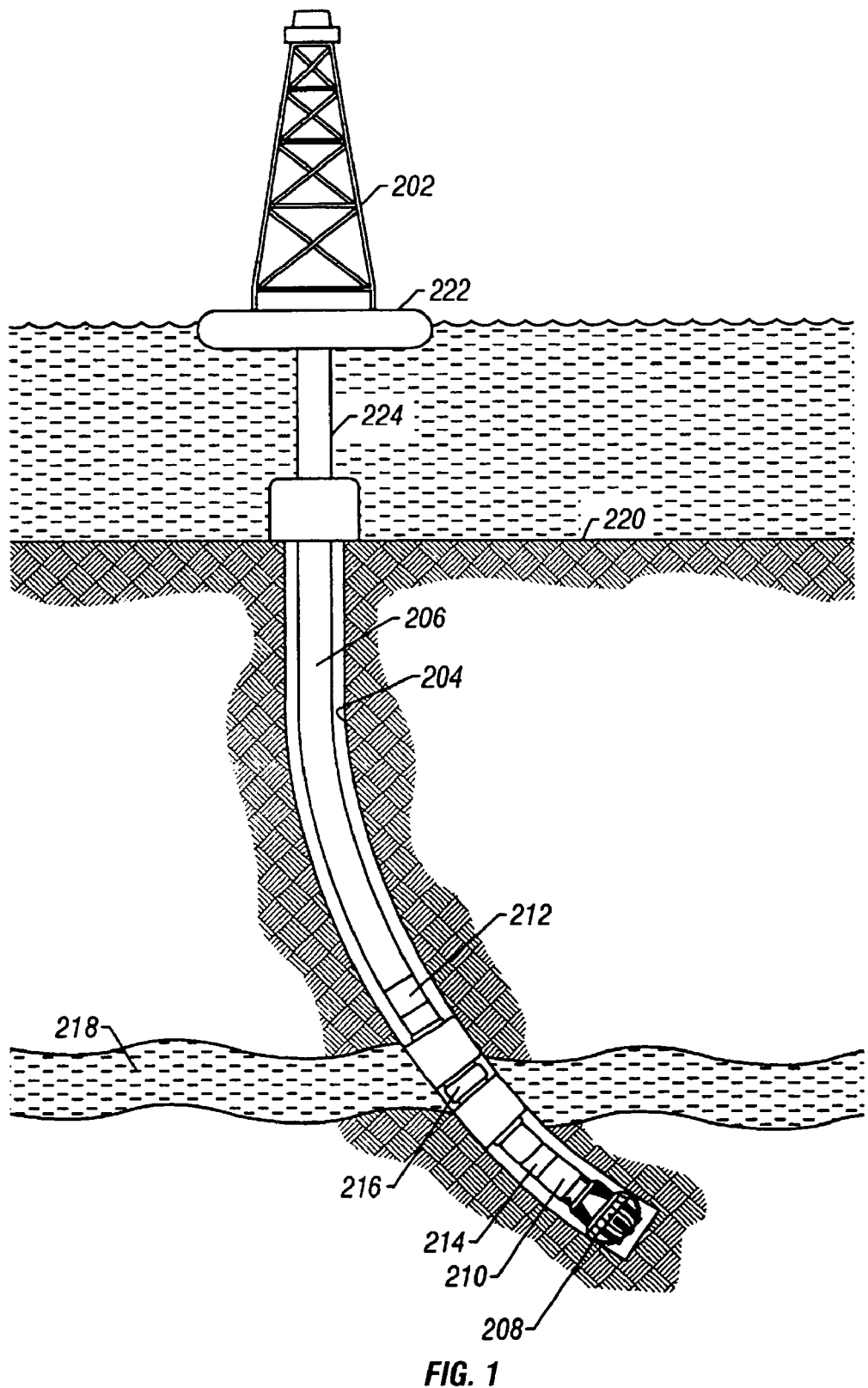
FIG. 1 is an elevation view of an offshore drilling system according to one embodiment of the present invention.

FIGS. 1–4 describe exemplary systems that may be used in the present invention. Any other suitable system for taking samples of formation fluid and making measurements thereon, such as those referenced above, may be used in the present invention. FIG. 1 is a drilling apparatus according to one embodiment of the present invention. A typical drilling rig 202 with a borehole 204 extending therefrom is illustrated, as is well understood by those of ordinary skill in the art. The drilling rig 202 has a work string 206, which in the embodiment shown is a drill string. The drill string 206 has attached thereto a drill bit 208 for drilling the borehole 204. The present invention is also useful in other types of work strings, and it is useful with a wireline, jointed tubing, coiled tubing, or other small diameter work string such as snubbing pipe. The drilling rig 202 is shown positioned on a drilling ship 222 with a riser 224 extending from the drilling ship 222 to the sea floor 220. However, any drilling rig configuration such as a land-based rig may be adapted to implement the present invention.

If applicable, the drill string 206 can have a downhole drill motor 210. Incorporated in the drill string 206 above the drill bit 208 is a typical testing unit, which can have at least one sensor 214 to sense downhole characteristics of the borehole, the bit, and the reservoir, with such sensors being well known in the art. A useful application of the sensor 214 is to determine direction, azimuth and orientation of the drill string 206 using an accelerometer or similar sensor. The bottom-hole-assembly (BHA) also contains the formation test apparatus 216 of the present invention, which will be described in greater detail hereinafter. A telemetry system 212 is located in a suitable location on the work string 206 such as above the test apparatus 216. The telemetry system 212 is used for command and data communication between the surface and the test apparatus 216.

Figure 2:
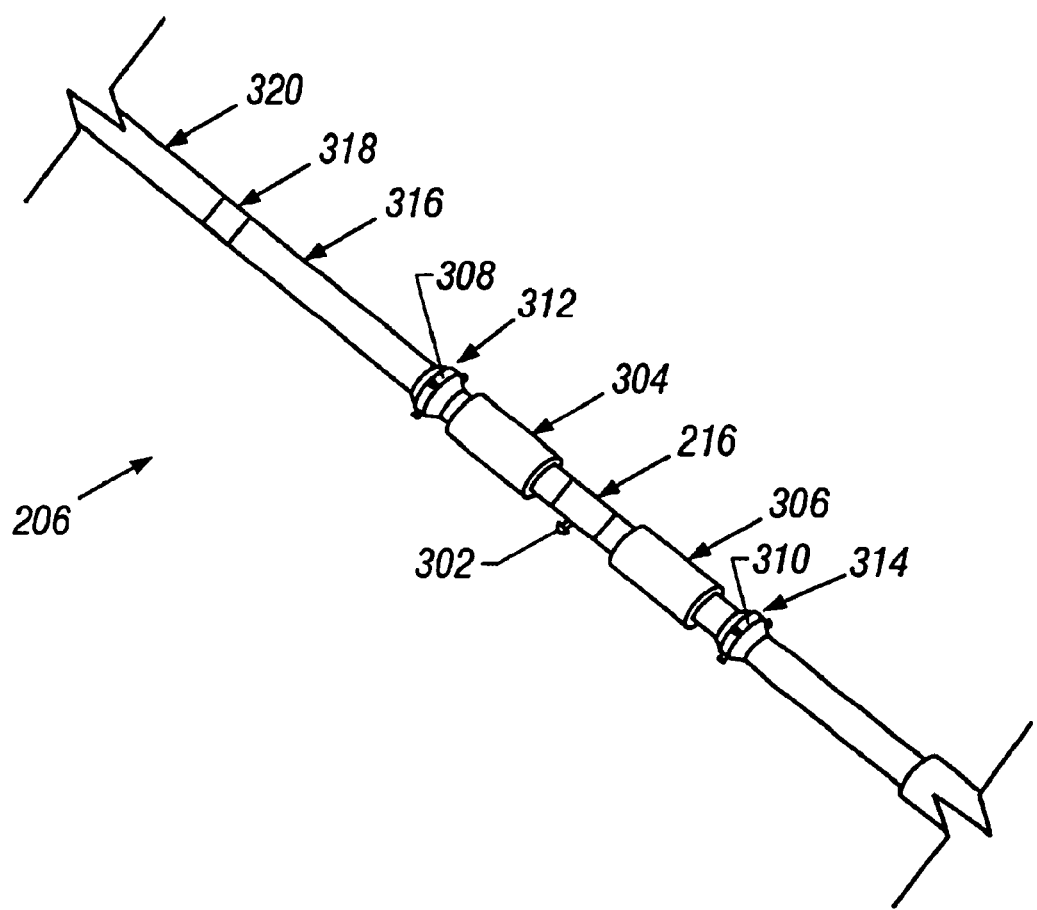
FIG. 2 shows a portion of drill string incorporating the present invention.

FIG. 2 is a section of drill string 206 incorporating the present invention. The tool section is commonly located in a BHA close to the drill bit (not shown). The tool includes a communication unit and power supply 320 for two-way communication to the surface and supplying power to the downhole components. In one embodiment, the tool requires a signal from the surface only for test initiation. A downhole controller and processor (not shown) carry out all subsequent control. The power supply may be a generator driven by a mud motor (not shown) or it may be any other suitable power source. Also included are multiple stabilizers 308 and 310 for stabilizing the tool section of the drill string 206 and packers 304 and 306 for sealing a portion of the annulus. A circulation valve disposed in the present example above the upper packer 304 is used to allow continued circulation of drilling mud above the packers 304 and 306 while rotation of the drill bit is stopped. A separate vent or equalization valve (not shown) is used to vent fluid from the test volume between the packers 304 and 306 to the upper annulus. This venting reduces the test volume pressure, which is required for a drawdown test. It is also contemplated that the pressure between the packers 304 and 306 could be reduced by drawing fluid into the system or venting fluid to the lower annulus, but in any case some method of increasing the volume of the intermediate annulus to decrease the pressure will be required.

In one embodiment of the present invention an extendable pad-sealing element 302 for engaging the well wall 3 is disposed between the packers 304 and 306 on the test apparatus 216. The pad-sealing element 302 could be used without the packers 304 and 306, because a sufficient seal with the well wall can be maintained with the pad 302 alone. If packers 304 and 306 are not used, a counterforce is required so pad 302 can maintain sealing engagement with the wall of the borehole 204. The seal creates a test volume at the pad seal and extending only within the tool to the pump rather than also using the volume between packer elements.

One way to ensure the seal is maintained is to ensure greater stability of the drill string 206. Selectively extendable gripper elements 312 and 314 could be incorporated into the drill string 206 to anchor the drill string 206 during the test. The grippers 312 and 314 are shown incorporated into the stabilizers 308 and 310 in this embodiment. The grippers 312 and 314, which would have a roughened end surface for engaging the well wall, would protect soft components such as the pad-sealing element 302 and packers 304 and 306 from damage due to tool movement. The grippers 312 would be especially desirable in offshore systems such as the one shown in FIG. 1, because movement caused by heave can cause premature wear out of sealing components.

Figure 3:
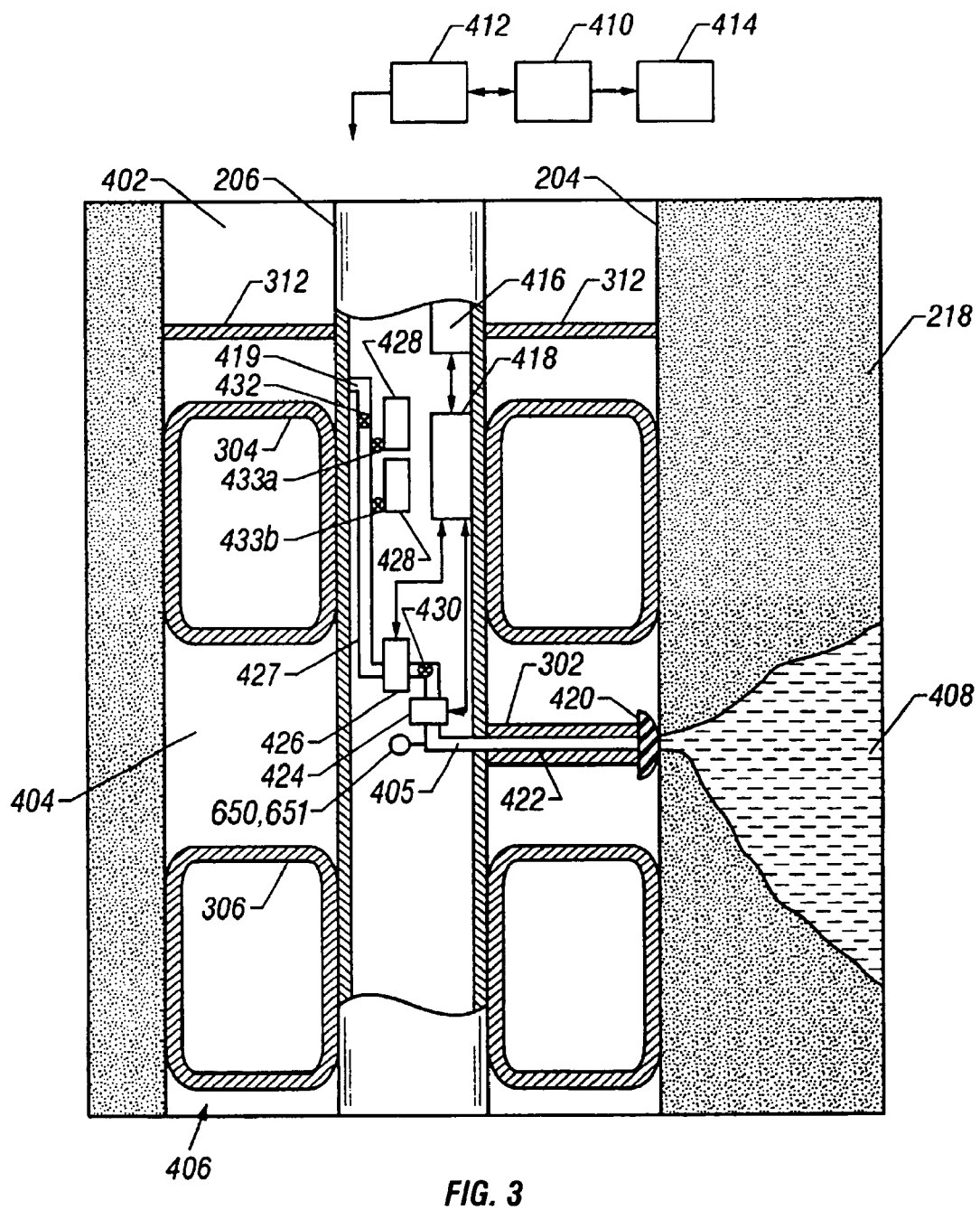
FIG. 3 is a system schematic of the present invention.

FIG. 3 shows the tool of FIG. 2 schematically with internal downhole and surface components. Selectively extendable gripper elements 312 engage the borehole wall 204 to anchor the drill string 206. Packer elements 304 and 306 well known in the art extend to engage the borehole wall 204. The extended packers separate the well annulus into three sections, an upper annulus 402, an intermediate annulus 404 and a lower annulus 406. The sealed annular section (or simply sealed section) 404 is adjacent a formation 218. Mounted on the drill string 206 and extendable into the sealed section 404 is the selectively extendable pad sealing element 302. A fluid line providing fluid communication between pristine formation fluid 408 and tool sensors, such as optical sensing module 424, is shown extending through the pad member 302 to provide a port 420 in the sealed annulus 404. In addition, sensors 650, 651 are included for determining the pressure and temperature of the formation fluid sample. The preferable configuration to ensure pristine fluid is tested or sampled is to have packers 304 and 306 sealingly urged against the wall 204, and to have a sealed relationship between the wall and extendable element 302. Reducing the pressure in sealed section 404 prior to engaging the pad 302 will initiate fluid flow from the formation into the sealed section 404. With formation flowing when the extendable element 302 engages the wall, the port 420 extending through the pad 320 will be exposed to pristine fluid 408. Control of the orientation of the extendable element 302 is highly desirable when drilling deviated or horizontal wells. The preferred orientation is toward an upper portion of the borehole wall. A sensor 214, such as an accelerometer, can be used to sense the orientation of the extendable element 302. The extendable element can then be oriented to the desired direction using methods and not-shown components well known in the art such as directional drilling with a bend-sub. For example, the drilling apparatus may include a drill string 206 rotated by a surface rotary drive (not shown). A downhole mud motor (see FIG. 1 at 210) may be used to independently rotate the drill bit. The drill string can thus be rotated until the extendable element is oriented to the desired direction as indicated by the sensor 214. The surface rotary drive is halted to stop rotation of the drill string 206 during a test, while rotation of the drill bit may be continued using the mud motor of desired.

A downhole controller 418 preferably controls the test. The controller 418 is connected to at least one system volume control device (pump) 426. The pump 426 is a preferably small piston driven by a ball screw and stepper motor or other variable control motor, because of the ability to iteratively change the volume of the system. The pump 426 may also be a progressive cavity pump. When using other types of pumps, a flow meter should also be included. A valve 430 for controlling fluid flow to the pump 426 is disposed in the fluid line 422 between optical sensing module 424 and the pump 426. A test volume 405 is the volume below the retracting piston of the pump 426 and includes the fluid line 422. The optical sensing module 424 is used to determine the refractive index of the formation fluid within the test volume 404. Any suitable system for determining the refractive index may be used. Examples of such optical systems, suitable for downhole use, are described in detail in U.S. Pat. No. 6,683,681 B2 and U.S. Published Application 2004/0007665 A1 each of which is assigned to the assignee of this application, and each of which is incorporated herein by reference. The optical sensing module 424 is connected to the controller 418 to provide the feedback data required for a closed loop control system. The feedback is used to adjust parameter settings such as detecting sample clean-up. Sample clean up refers to the transition from filtrate-contaminated formation fluid to nearly pure formation fluid while pumping fluid from selected depths in the wellbore. The downhole controller may incorporate a processor (not separately shown) for further reducing test time, and an optional database and storage system may be incorporated to save data for further analysis and for providing default settings.

When drawing down the sealed section 404, fluid is vented to the upper annulus 402 via an equalization valve 419. A conduit 427 connecting the pump 426 to the equalization valve 419 includes a selectable internal valve 432. If fluid sampling is desired, the fluid may be diverted to optional sample reservoirs 428 by using the internal valves 432, 433a, and 433b rather than venting through the equalization valve 419. For typical fluid sampling, the fluid contained in the reservoirs 428 is retrieved from the well for analysis.

One embodiment for testing low mobility (tight) formations includes at least one pump (not separately shown) in addition to the pump 426 shown. The second pump should have an internal volume much less than the internal volume of the primary pump 426. A suggested volume of the second pump is 1/100 the volume of the primary pump. A typical "T" connector having selection valve controlled by the downhole controller 418 may be used to connect the two pumps to the fluid line 422.

In a tight formation, the primary pump is used for the initial draw down. The controller switches to the second pump for operations below the formation pressure. An advantage of the second pump with a small internal volume is that build-up times are faster than with a pump having a larger volume.

Results of data processed downhole may be sent to the surface in order to provide downhole conditions to a drilling operator or to validate test results. The controller passes processed data to a two-way data communication system 416 disposed downhole. The downhole system 416 transmits a data signal to a surface controller 412 that contains a processor and memory storage. There are several methods and apparatuses known in the art suitable for transmitting data. Any suitable system would suffice for the purposes of this invention. The signal is received at the surface where a surface controller 412 and processor 410 converts and transfers the data to a suitable output and/or storage device 414. As described earlier, surface controller 412 may also be used to send the test initiation command.

Figure 4:
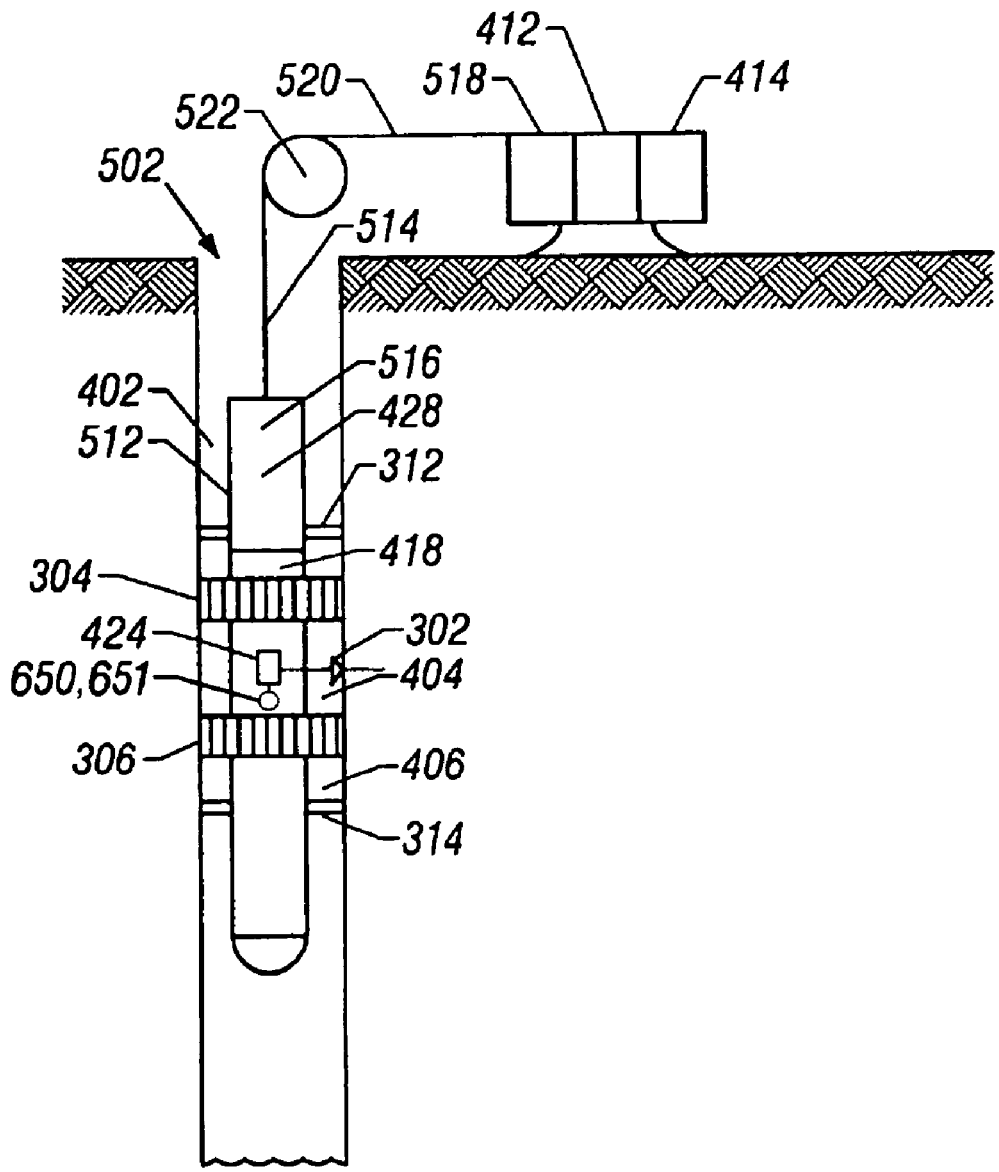
FIG. 4 is an elevation view of a wireline embodiment according to the present invention.

FIG. 4 is a wireline embodiment according to the present invention. A well 502 is shown traversing a formation 504 containing a reservoir having gas 506, oil 508 and water 510 layers. A wireline tool 512 supported by an armored cable 514 is disposed in the well 502 adjacent the formation 504. Extending from the tool 512 are optional grippers 312 and 314 for stabilizing the tool 512. Two expandable packers 304 and 306 are disposed on the tool 512 are capable of separating the annulus of the borehole 502 into an upper annulus 402, a sealed intermediate annulus 404 and a lower annulus 406. A selectively extendable pad member 302 is disposed on the tool 512. The grippers 312, packers 304 and 306, and extendable pad element 302 are essentially the same as those described in FIGS. 2 and 3, therefore the detailed descriptions are not repeated here.

Telemetry for the wireline embodiment is a downhole two-way communication unit 516 connected to a surface two-way communication unit 518 by one or more conductors 520 within the armored cable 514. The surface communication unit 518 is housed within a surface controller 412 that includes a processor and memory, and output device 414 as described previously. A typical cable sheave 522 is used to guide the armored cable 514 into the borehole 502. The tool 512 includes a downhole controller 418 having a processor and memory for controlling formation tests in accordance with methods to be described in detail later. The downhole tool 512 includes a plurality of sensors including optical sensing module 424 and optional sample tanks 428 as described above for the embodiment shown in FIG. 3. The optical sensing module 424 is used to measure refractive index of formation fluid samples at varying depths within the borehole 502.

Figure 5:
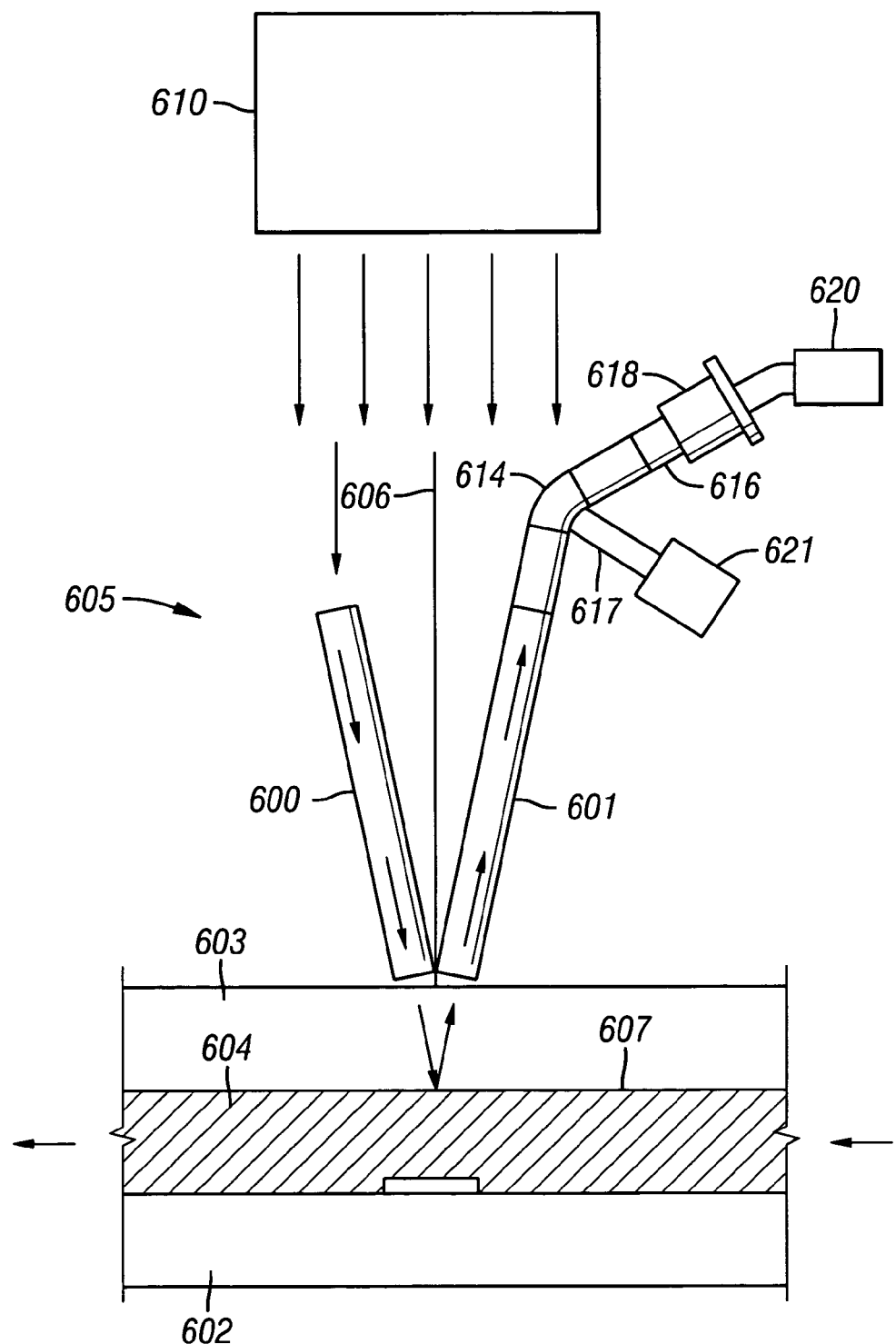
FIG. 5 is a schematic of an optical refractometer suitable for use in a downhole tool for determining index of refraction of a fluid sample.

FIG. 5 show a schematic of a suitable refractometer assembly 605 for use in the optical sensing module 424 of the present invention. Light source 610 comprises a tungsten light bulb and a collimator lens. The collimated light beam is incident substantially perpendicular to the exterior surface of a first sapphire window 603. Sapphire windows 603 and 602 lie substantially perpendicular to the collimated beam of light and are separated by a gap or channel 604 enabling a sample formation fluid under analysis to flow between them. In one embodiment, the refractometer assembly 605 diverts a portion of the incident collimated beam from source 610 and focuses it onto interface 607 between the first sapphire window 603 and the fluid in channel 604. The reflected light beam is split at beam splitter 617 between a refractometer (616, 618, and 620) and an attenuated reflectance spectrometer 621. That portion of the collimated light beam which is not diverted for use in the refractometer or the attenuated reflectance spectrometer, continues on for use in other sensors.

As shown in FIG. 5, two optical transmission rods 600, 601 (which can be relay lenses or could simply be glass or sapphire rods) referred to as the left rod 600 and the right rod 601. The longitudinal axes of the two optical transmission rods lie in a plane perpendicular to the plane of both of the pressure containment plates 603, 602 comprising a first sapphire window 603 and a second sapphire window 602 and the channel 604. In addition, the two optical transmission rods 600, 601 are preferably side-by-side (and contacting each other where they meet 603) and may also be in contact the first sapphire plate 603. To maximize the light signal, a high-temperature index matching gel may be applied to bridge the gap between transmission rods 600, 601 and first sapphire plate 603. Leaving the gap unfilled except for air does not change the refractive index measurement because it diminishes the light intensity measurements of both the unknown and the reference sample by the same factor. Such a system may be used to determine the refractive index of the formation fluid sample in channel 304. For further details of the measurement and analysis techniques for determining the refractive index, see U.S. Pat. No. 6,683,681 B2 and U.S. Published Application 2004/0007665 A1 which have been previously incorporated herein by reference. The general fluid type (gas, oil, or brine) can be determined from the visible and near infrared spectra collected by a downhole spectrometer associated with the refractometer, or used in conjunction with it.

Figure 6:
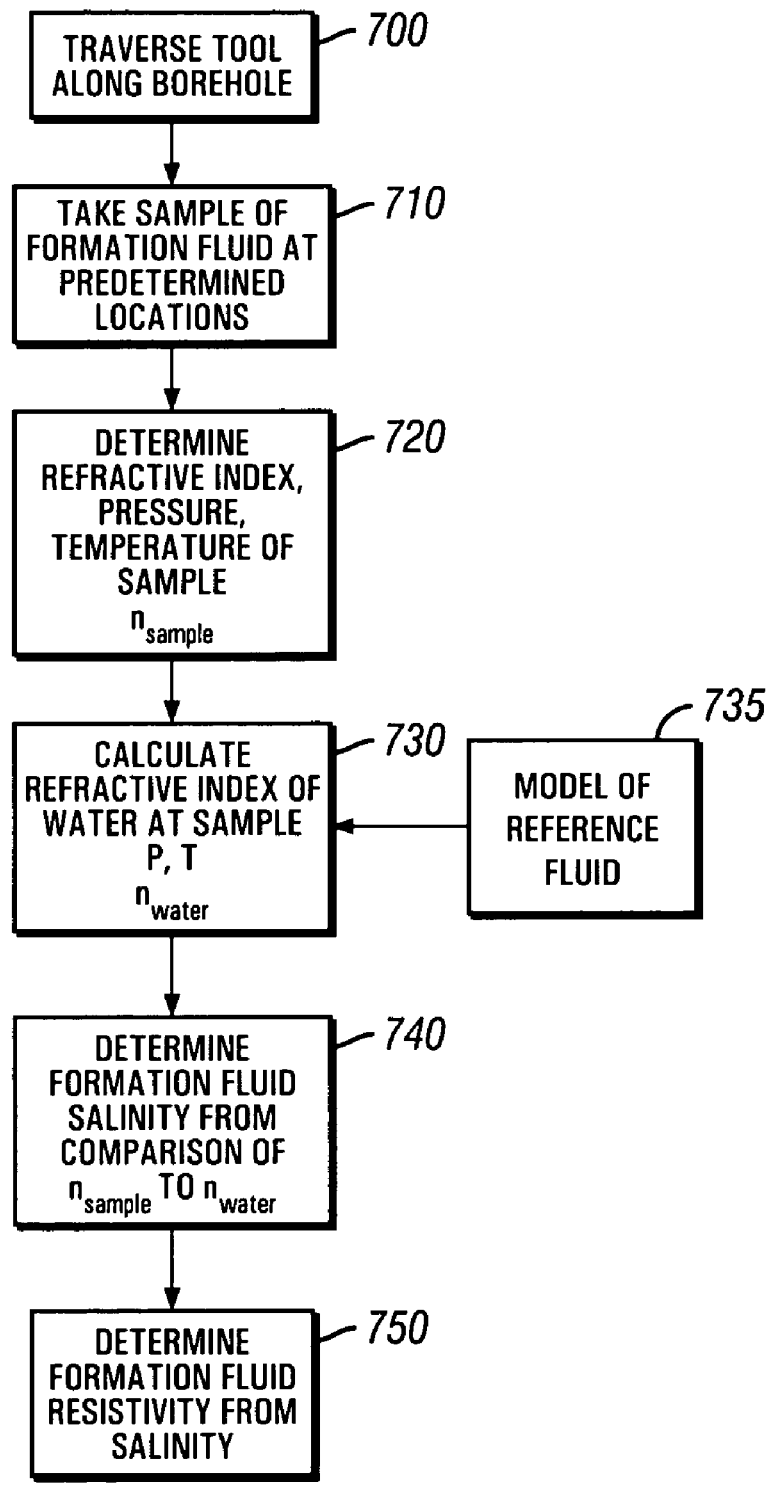
FIG. 6 is a flow chart describing the process of determining a formation fluid resistivity according to embodiments of the present invention.

As described previously, when interpreting electric well logs in regions having brine formation fluids, it is important to know the formation brine resistivity. In one embodiment, the present invention relates the formation fluid refractive index to the formation fluid salinity, assuming that the formation fluid is substantially brine. The formation fluid resistivity is then determined using published data relating fluid salinity to resistivity. This process is described in the flow chart of FIG. 6. In step 700, a formation test tool, such as one of the exemplary tools described previously, is traversed along the borehole and stopped at predetermined locations of interest along the borehole. At each predetermined location, the tool is used to obtain a sample of the formation 710. The sample is passed by the sensors described to determine the fluid sample refractive index as well as pressure and temperature of the fluid sample 720. Such data may be transmitted to surface processor 412 and/or downhole processor 418 for further analysis.

It is well known that the refractive index of saltwater increases with the concentration of salt. Near room temperature and pressure, this relationship is used to quantitatively determine brine salinity. Using this physical response, the refractive index of pure water at downhole conditions may be compared to the measured refractive index of the formation fluid sample to determine the salinity of the formation fluid sample. At downhole conditions, the effects of pressure and temperature must be accounted for. For example, the refractive index of water increases with density while the density of water increases with pressure but decreases with temperature. The refractive index of pure water may be calculated 730 using a model 735 published by the International Association for the Properties of Water and Steam (IAPWS) titled "Release on the Refractive Index of Ordinary Water Substances as a Function of Wavelength, Temperature and Pressure" published by the International Association for the Properties of Water and Steam, Erlangen, Germany, September 1997, which is incorporated herein by reference. The model is of the form;

$$\frac{(n^2-1)}{(n^2+2)}(1/\bar{\rho}) = a_0 + a_1\bar{\rho} + a_2\bar{T} + a_3\bar{\lambda}^2\bar{T} + a_4/\bar{\lambda}^2 + \frac{a_5}{\bar{\lambda}^2 - \bar{\lambda}_{UV}^2} + \frac{a_6}{\bar{\lambda}^2 - \bar{\lambda}_{IR}^2} + a_7\bar{\rho}^2 \quad (1)$$

where, $\alpha_0 = 0.244\ 257\ 733$
$\alpha_1 = 9.746\ 344\ 76 \cdot 10^{-3}$
$\alpha_2 = -3.732\ 349\ 96 \cdot 10^{-3}$
$\alpha_3 = 2.686\ 784\ 72 \cdot 10^{-4}$
$\alpha_4 = 1.589\ 205\ 70 \cdot 10^{-3}$
$\alpha_5 = 2.459\ 342\ 59 \cdot 10^{-3}$
$\alpha_6 = 0.900\ 704\ 920$
$\alpha_7 = -1.666\ 262\ 19 \cdot 10^{-2}$
$\bar{\lambda}_{UV} = 0.229\ 202\ 0$
$\bar{\lambda}_{IR} = 5.432\ 937$
and Temperature $\bar{T} = T/T^*$ Density $\bar{\rho} = \rho/\rho^*$ Wavelength $\bar{\lambda} = \bullet/\bullet^*$ where, $T^* = 273.15$ K
$\rho^* = 1000$ kg/m$^3$
$\lambda^* = 0.589$ μm Eq. 1 is used to determine what the refractive index is of water at the measured sample pressure and temperature, $n_{water}$. To use Eq. 1, the density of water at the formation fluid sample pressure and temperature is calculated from one of the following empirical models of water. For example, for pressures less than 100 MPa (14,500 psi) and temperatures to 325 C, correlations are available such as the IAPWS-97 model of the International Association for the Properties of Water and Steam available from the National Institute of Standards and Technology (NIST) of Gaitherburg, Md. Alternatively, a correlation covering the range of 25 C to 250 C and atmospheric to 206 MPA (30,000 psi) is calculated using the data for the density of water at varying pressure and temperature gathered from the NIST database (see Table 1). The data are correlated for the density of pure water as a function of pressure and temperature using a commercial statistical package, such as the STATISTICA™ brand of statistical software marketed by StatSoft®, Inc. of Tulsa, Okla. The resulting equation is based on 336 data points, has an $R^{2=0.99986}$, a standard error of 0.00073 g/ml, and is given by:

$$\rho\text{water(g/ml)} = 1.00806 - 2.27533 \times 10^{-6} * T^2 + 2.7666583 \times 10^{-3} * P + 5.906096 \times 10^{-8} * PT^2 - 2.706382 \times 10^{-4} * T - 2.81544 \times 10^{-7} * P^2 T - 50.79548 * T^{-3} + 4.764802 \times 10^{-7} * P^3 - 1.220952 \times 10^{-5} * P^2 \quad (2)$$

where T is the measured formation temperature in ° C., and P is the measured formation pressure in kpsi (1 psi=6.89 kPa).

The Clausius-Mossotti equation (Eq. 2) relates the Clausius-Mossotti ratio (also called the Lorentz-Lorenz ratio), CMR=LLR=$(n^2-1)/(n^2+2)$, to the mass density, $\rho$, and molar polarizability, P, and the gram-molecular weight, M.

$$(n^2-1)/(n^2+2) = \rho P_m/M \quad (3)$$

For a particular geographic area, the polarizability divided by the gram molecular weight is substantially constant, such that the CMR may be related to the fluid density. For an ideal mixture, the volumetrically weighted sum of each component's Clausius-Mossotti ratio is equal to the mixture's Clausius-Mossotti ratio. This relates the index of refraction of a mixture to the index of refraction of its constituent components. That is, if a mixture's index of refraction is n, and the i-th component of the mixture occupies a volume fraction, $f_i$, and has an index of refraction, $n_i$, then, $$\{(n^2-1)/(n^2+2)\}_{mixture} = \Sigma f_i (n_i^2-1)/(n_i^2+2) \quad (4)$$

Then, for a brine solution of essentially salt and water, $$CMR_{Brine} = f_{v\_water} * CMR_{water} + f_{v\_salt} * CMR_{salt} \quad (5)$$

With algebraic manipulation, the formation fluid sample's volume fraction of salt, $f_{v\_salt}$, may be determined 740, $$f_{v\_salt} = (CMR_{Brine} - CMR_{water})/(CMR_{salt} - CMR_{water}) \quad (6)$$

where, the salinity, S, is commonly expressed in parts-per-million (ppm) by weight of salt per weight of brine. Thus, salinity, S in ppm, is equivalent to one million times the weight fraction of salt, $f_{w\_salt}$. Equivalent unit, such as milligrams of salt per kilogram of brine, may also be used. The weight fraction of salt may be related to the volume fraction of salt by, $$(\rho_{salt}/\rho_{water}) * (1/f_{w\_salt} - 1) = (1/f_{v\_salt} - 1) \quad (7)$$

Using correlations 755 known in the art, salinity is related to resistivity 750. For example, the salinity is compared to published charts of salinity versus resistivity. Such charts include "Log Interpretation Charts/Dresser Atlas", Houston, Tex., Dresser Atlas Division of Dresser Industries, 1979 (now Baker Atlas, Division of Baker Hughes Incorporated). Also see "Log Interpretation Charts", Houston, Tex., Schlumberger Inc., 1972 and 1979. Alternatively, such chart correlations, or their underlying data, may be converted to a multi-variable correlation model of brine resistivity as a function of brine salinity, downhole pressure, and downhole temperature, using techniques known in the art. One such exemplary model, published by Baker Atlas in the Log Interpretation Charts described above, is of the form:

$$R_{brineT} = \{0.0123 + [3647.5/(S)^{0.955}]\} * [45.4/(T+21.5)] \quad (8)$$

where $R_{brineT}$ is the resistivity in ohm-meters at the measured downhole temperature, T in ° C., and S is the salinity (NaCl concentration in ppm) determined from Eq. 7.

Such a model may be stored in surface processor 412 and/or downhole processor 518 for analysis of the formation fluid sample, in situ. Therefore, in one embodiment, the present invention provides resistivity of the formation fluid sample from measurements of the formation fluid refractive index at predetermined locations along the borehole.

Figure 7:
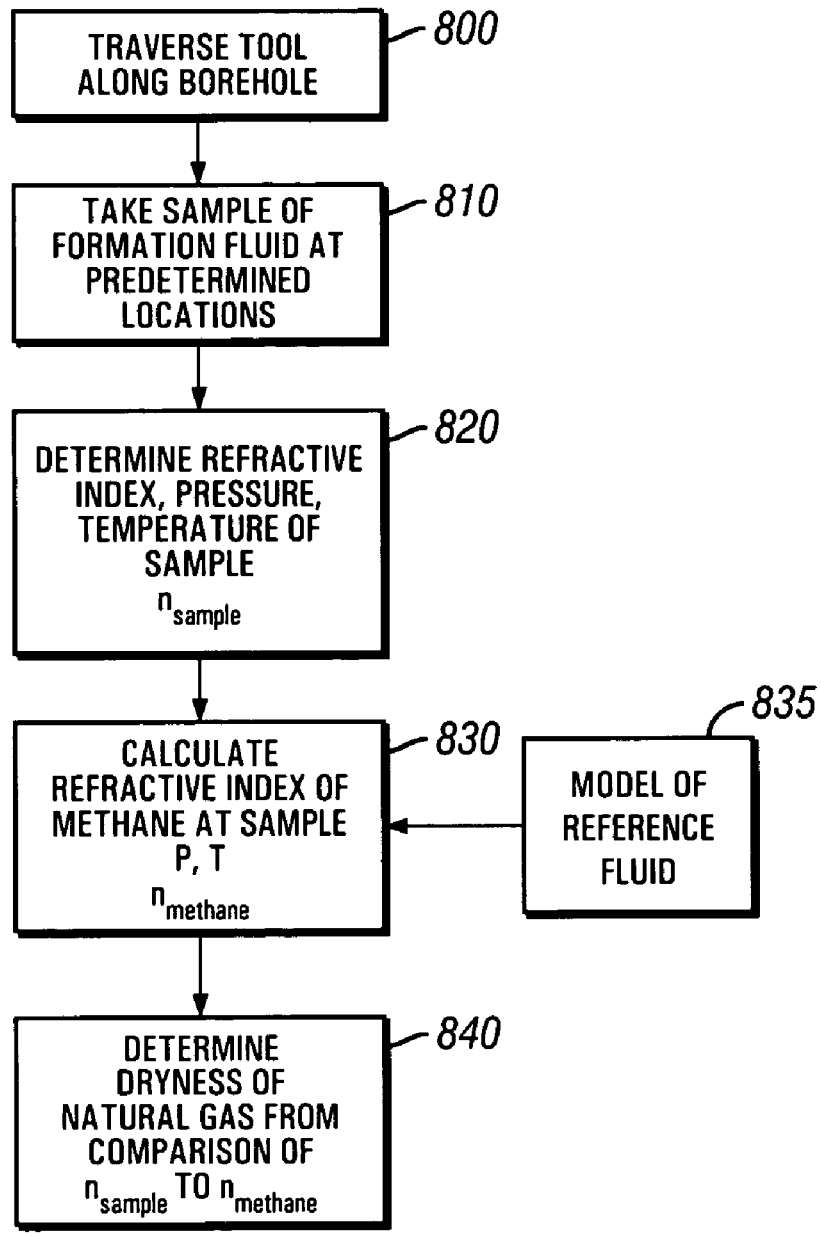
FIG. 7 is a flow chart describing the process of determining the dryness of natural gas according to embodiments of the present invention.

In another embodiment, see FIG. 7, refractive index of a formation fluid sample along with formation fluid pressure and formation fluid temperature may be used to determine the dryness of a natural gas in the formation. The closer a natural gas composition is to pure methane, the "drier" that gas is said to be. In this embodiment, a refractive index of methane at downhole sample conditions is calculated from an analytical model and compared to the fluid sample measured refractive index. The higher molecular weight hydrocarbons, such as ethane, propane, butane, pentane, etc. have higher refractive indices that would tend to deviate the mixture refractive index from that of pure methane. The closer the natural gas sample refractive index is to that of pure methane, the "drier" the natural gas is. The Steps 800–820 are similar to steps 700–720 as described above. Here, however, the refractive index of the formation sample is compared to the refractive index for pure methane to determine the relative gas dryness. The density of pure methane at measured downhole conditions is determined using an empirical correlation of available data shown in Table 2. The data were correlated using the Statistica™ brand statistical package described previously to provide methane density as a function of downhole formation pressure and formation temperature. The correlation for determining methane density is based on 234 data points, has an $R^2 = 0.99914$, a standard error of 0.00392 g/ml, and is given by:

$$\begin{aligned}\rho_{methane}(g/ml) &= 2.770625 \times 10^{-3} + 2.480415 \times 10^{-5} * P - 1.120014 \times \\&\quad 10^{-9} * P^2 + 1.808398 \times 10^{-14} * P^3 - 1.307547 \times 10^{-7} * T + \\&\quad 1.455411 \times 10^{-3} * (P/T) - 4.922499 \times 10^{-6} * (P/T)^2 + \\&\quad 5.933963 \times 10^{-9} * (P/T)^3\end{aligned} \quad (9)$$

where T is the measured formation temperature in ° C., and P is the measured formation pressure in kpsi (1 psi=6.89 kPa). Then the calculated molar density of the pure methane at downhole conditions may be divided by methane's mass per mole (16.04 g/mole) to estimate the molar density at downhole conditions. According to Badoz et al., Review of Scientific Instruments, Vol. 63(5), p. 1–7, 1992, the refractive index, $n_{methane}$, of methane is related to the molar density and the wavelength (measured in cm) of light by the following model 835, $$CMR_{methane} = (n^2_{methane} - 1)/(n^2_{methane} + 2) = (\text{molar density of methane}) * (R_{inf} + A/\lambda^2) \quad (10)$$

where, $R_{inf} = 6.262$ cm³/mole and $A = 8.756 \times 10^{-10}$ cm⁵/mole. Then, the refractive index of pure methane at downhole conditions 830, $$n_{methane} = \sqrt{(1 + 2 * CMR_{meth})/(1 - CMR_{meth})} \quad (11)$$

Then $n_{methane}$ and $n_{sample}$ are compared to determine the dryness of the natural gas. For example, the closeness of the difference, $D = n_{sample} - n_{methane}$, to zero is an indicator of the dryness of the natural gas sample. Alternatively, the closeness of the ratio, $R = n_{sample}/n_{methane}$ to one is an indicator of the dryness of the natural gas sample. A completely dry natural gas is 100% methane, with no heavier hydrocarbons, such as, for example, ethane, propane, butane, and so on.

The present invention has been described as methods and apparatus operating in a downhole environment. However, the present invention may also be embodied as a set of instructions on a computer readable medium comprising ROM, RAM, CD ROM, DVD, FLASH or any other computer readable medium, now known or unknown, that, when executed, causes a computer such as, for example, a processor in downhole controller 418 and/or a processor in surface controller 412, to implement the method of the present invention.

The foregoing description is directed to particular embodiments of the present invention for the purpose of illustration and explanation. It will be apparent, however, to one skilled in the art that many modifications and changes to the embodiment set forth above are possible. It is intended that the following claims be interpreted to embrace all such modifications and changes.

TABLE 1

Density of Water (g/ml) vs. Pressure (psi) and Temperature (C.) (NIST data)

| P [psi] | T [C.] | | | | | | | | | |
|---|---|---|---|---|---|---|---|---|---|---|
| | 25 | 50 | 75 | 100 | 125 | 150 | 175 | 200 | 225 | 250 |
| 14.7 | 0.99705 | 0.98804 | 0.97484 | 0.95835 | | | | | | |
| 29.4 | 0.99709 | 0.98808 | 0.97489 | 0.95840 | | | | | | |
| 33.7 | | | | | 0.93902 | | | | | |
| 44.1 | 0.99714 | 0.98812 | 0.97493 | 0.95844 | 0.93906 | | | | | |
| 58.8 | 0.99718 | 0.98817 | 0.97498 | 0.95849 | 0.93911 | | | | | |
| 69.1 | | | | | | 0.91701 | | | | |
| 73.5 | 0.99723 | 0.98821 | 0.97502 | 0.95854 | 0.93916 | 0.91703 | | | | |
| 88.2 | 0.99728 | 0.98826 | 0.97507 | 0.95859 | 0.93922 | 0.91708 | | | | |
| 100.0 | 0.99731 | 0.98829 | 0.97510 | 0.95863 | 0.93926 | 0.91713 | | | | |
| 129.5 | | | | | | | 0.89228 | | | |
| 200.0 | 0.99762 | 0.98859 | 0.97541 | 0.95895 | 0.93961 | 0.91752 | 0.89260 | | | |
| 225.5 | | | | | | | | 0.86466 | | |
| 300.0 | 0.99793 | 0.98889 | 0.97572 | 0.95927 | 0.93996 | 0.91791 | 0.89304 | 0.86505 | | |
| 369.8 | | | | | | | | | 0.83375 | |
| 400.0 | 0.99824 | 0.98919 | 0.97602 | 0.95959 | 0.94031 | 0.91830 | 0.89349 | 0.86557 | 0.83394 | |
| 500.0 | 0.99855 | 0.98949 | 0.97632 | 0.95991 | 0.94066 | 0.91869 | 0.89393 | 0.86609 | 0.83458 | |
| 576.7 | | | | | | | | | | 0.79889 |
| 600.0 | 0.99886 | 0.98979 | 0.97663 | 0.96023 | 0.94100 | 0.91907 | 0.89437 | 0.86661 | 0.83521 | 0.79908 |
| 700.0 | 0.99917 | 0.99009 | 0.97693 | 0.96055 | 0.94135 | 0.91946 | 0.89481 | 0.86713 | 0.83584 | 0.79988 |
| 800.0 | 0.99948 | 0.99038 | 0.97723 | 0.96087 | 0.94170 | 0.91985 | 0.89525 | 0.86764 | 0.83646 | 0.80068 |
| 900.0 | 0.99978 | 0.99068 | 0.97754 | 0.96119 | 0.94204 | 0.92023 | 0.89569 | 0.86816 | 0.83708 | 0.80147 |
| 1000.0 | 0.99700 | 0.99098 | 0.97784 | 0.96151 | 0.94239 | 0.92061 | 0.89613 | 0.86867 | 0.83770 | 0.80225 |
| 2000.0 | 1.00010 | 0.99392 | 0.98083 | 0.96466 | 0.94579 | 0.92438 | 0.90040 | 0.87365 | 0.84369 | 0.80976 |
| 3000.0 | 1.00310 | 0.99682 | 0.98377 | 0.96774 | 0.94912 | 0.92805 | 0.90454 | 0.87843 | 0.84937 | 0.81676 |
| 4000.0 | 1.00610 | 0.99967 | 0.98666 | 0.97077 | 0.95237 | 0.93163 | 0.90856 | 0.88304 | 0.85479 | 0.82334 |
| 5000.0 | 1.00910 | 1.00250 | 0.98951 | 0.97375 | 0.95556 | 0.93512 | 0.91246 | 0.88748 | 0.85997 | 0.82954 |
| 6000.0 | 1.01200 | 1.00530 | 0.99231 | 0.97668 | 0.95869 | 0.93853 | 0.91625 | 0.89178 | 0.86495 | 0.83543 |
| 7000.0 | 1.01490 | 1.00800 | 0.99508 | 0.97955 | 0.96176 | 0.94187 | 0.91994 | 0.89594 | 0.86973 | 0.84104 |
| 8000.0 | 1.01770 | 1.01070 | 0.99780 | 0.98238 | 0.96477 | 0.94513 | 0.92354 | 0.89998 | 0.87433 | 0.84640 |
| 9000.0 | 1.02050 | 1.01340 | 1.00050 | 0.98517 | 0.96772 | 0.94833 | 0.92705 | 0.90390 | 0.87878 | 0.85153 |
| 10000.0 | 1.02330 | 1.01600 | 1.00310 | 0.98791 | 0.97063 | 0.95146 | 0.93048 | 0.90771 | 0.88309 | 0.85647 |
| 11000.0 | 1.02600 | 1.01860 | 1.00570 | 0.99061 | 0.97348 | 0.95453 | 0.93384 | 0.91143 | 0.88726 | 0.86122 |
| 12000.0 | 1.02870 | 1.02120 | 1.00830 | 0.99327 | 0.97629 | 0.95754 | 0.93712 | 0.91505 | 0.89131 | 0.86581 |
| 13000.0 | 1.03140 | 1.02370 | 1.01090 | 0.99589 | 0.97905 | 0.96050 | 0.94033 | 0.91858 | 0.89524 | 0.87025 |
| 14000.0 | 1.03400 | 1.02620 | 1.01340 | 0.99847 | 0.98177 | 0.96340 | 0.94347 | 0.92203 | 0.89907 | 0.87454 |
| 15000.0 | 1.03660 | 1.02860 | 1.01580 | 1.00100 | 0.98444 | 0.96626 | 0.94656 | 0.92540 | 0.90280 | 0.87871 |
| 16000.0 | 1.03910 | 1.03110 | 1.01830 | 1.00350 | 0.98708 | 0.96906 | 0.94959 | 0.92870 | 0.90643 | 0.88276 |
| 17000.0 | 1.04170 | 1.03350 | 1.02070 | 1.00600 | 0.98968 | 0.97182 | 0.95255 | 0.93193 | 0.90998 | 0.88669 |
| 18000.0 | 1.04420 | 1.03590 | 1.02310 | 1.00850 | 0.99224 | 0.97454 | 0.95547 | 0.93510 | 0.91345 | 0.89053 |
| 19000.0 | 1.04660 | 1.03820 | 1.02540 | 1.01090 | 0.99476 | 0.97721 | 0.95834 | 0.93820 | 0.91684 | 0.89426 |
| 20000.0 | 1.04910 | 1.04060 | 1.02780 | 1.01330 | 0.99725 | 0.97985 | 0.96115 | 0.94124 | 0.92015 | 0.89790 |
| 22000.0 | 1.05620 | 1.04510 | 1.03230 | 1.01800 | 1.00210 | 0.98500 | 0.96665 | 0.94716 | 0.92658 | 0.90493 |
| 24000.0 | 1.06080 | 1.04960 | 1.03680 | 1.02250 | 1.00690 | 0.99000 | 0.97197 | 0.95287 | 0.93276 | 0.91166 |
| 26000.0 | 1.06530 | 1.05400 | 1.04120 | 1.02700 | 1.01150 | 0.99487 | 0.97714 | 0.95840 | 0.93871 | 0.91811 |
| 28000.0 | 1.06970 | 1.05830 | 1.04550 | 1.03140 | 1.01610 | 0.99962 | 0.98216 | 0.96375 | 0.94445 | 0.92431 |
| 30000.0 | 1.07400 | 1.06250 | 1.04970 | 1.03560 | 1.02050 | 1.00420 | 0.98704 | 0.96894 | 0.95001 | 0.93029 |

TABLE 2

Density of Methane (g/ml) vs. Pressure (psi) and Temperature (C.)

| P (psi) | T (C.) | | | | | |
|---|---|---|---|---|---|---|
| | 75 | 100 | 125 | 150 | 175 | 200 |
| | Density (g/cc) | | | | | |
| 100 | 0.0038457 | 0.0035816 | 0.0033522 | 0.0031508 | 0.0029725 | 0.0028136 |
| 200 | 0.0077397 | 0.0071954 | 0.0067252 | 0.0063145 | 0.0059524 | 0.0056305 |
| 300 | 0.0116810 | 0.0108400 | 0.0101180 | 0.0094090 | 0.0089386 | 0.0084498 |
| 400 | 0.0156680 | 0.0145140 | 0.0135290 | 0.0126760 | 0.0119300 | 0.0112710 |
| 500 | 0.0196990 | 0.0182150 | 0.0169560 | 0.0158720 | 0.0149260 | 0.0140920 |
| 600 | 0.0237720 | 0.0219420 | 0.0203990 | 0.0190750 | 0.0179250 | 0.0169140 |
| 700 | 0.0278850 | 0.0256930 | 0.0238550 | 0.0222850 | 0.0209260 | 0.0197340 |
| 800 | 0.0320360 | 0.0294650 | 0.0273230 | 0.0255010 | 0.0239280 | 0.0225520 |
| 900 | 0.0362200 | 0.0332570 | 0.0308000 | 0.0287200 | 0.0269290 | 0.0253680 |
| 1000 | 0.0404360 | 0.0370650 | 0.0342850 | 0.0319410 | 0.0299290 | 0.0281790 |
| 2000 | 0.0833620 | 0.0751400 | 0.0691010 | 0.0639300 | 0.0595930 | 0.0558850 |
| 3000 | 0.1242300 | 0.1120100 | 0.1023300 | 0.0944430 | 0.0878610 | 0.0822670 |
| 4000 | 0.1593700 | 0.1444300 | 0.1323200 | 0.1223000 | 0.1138900 | 0.1067000 |
| 5000 | 0.1880600 | 0.1719200 | 0.1584100 | 0.1470100 | 0.1372800 | 0.1288900 |

TABLE 2-continued

Density of Methane (g/ml) vs. Pressure (psi) and Temperature (C.)

| P (psi) | T (C.) | | | | | |
|---|---|---|---|---|---|---|
| | 75 | 100 | 125 | 150 | 175 | 200 |
| | Density (g/cc) | | | | | |
| 6000 | 0.2113500 | 0.1949300 | 0.1808000 | 0.1686100 | 0.1580500 | 0.1488200 |
| 7000 | 0.2305400 | 0.2142900 | 0.2000100 | 0.1874600 | 0.1764100 | 0.1666500 |
| 8000 | 0.2466700 | 0.2308000 | 0.2166100 | 0.2039600 | 0.1926800 | 0.1826000 |
| 9000 | 0.2605100 | 0.2450800 | 0.2311200 | 0.2185300 | 0.2071700 | 0.1969200 |
| 10000 | 0.2725800 | 0.2576200 | 0.2439400 | 0.2314900 | 0.2201600 | 0.2098500 |
| 11000 | 0.2832800 | 0.2687500 | 0.2553900 | 0.2431200 | 0.2318800 | 0.2215800 |
| 12000 | 0.2928700 | 0.2787600 | 0.2657000 | 0.2536400 | 0.2425300 | 0.2322900 |
| 13000 | 0.3015600 | 0.2878400 | 0.2750800 | 0.2632400 | 0.2522700 | 0.2421200 |
| 14000 | 0.3095100 | 0.2961400 | 0.2836700 | 0.2720500 | 0.2616400 | 0.2511900 |
| 15000 | 0.3168300 | 0.3037900 | 0.2915900 | 0.2801800 | 0.2695300 | 0.2596000 |
| 16000 | 0.3236100 | 0.3108900 | 0.2989400 | 0.2877300 | 0.2772500 | 0.2674300 |
| 17000 | 0.3299400 | 0.3174900 | 0.3057800 | 0.2947800 | 0.2844500 | 0.2747600 |
| 18000 | 0.3358700 | 0.3236800 | 0.3122000 | 0.3013800 | 0.2912100 | 0.2816400 |
| 19000 | 0.3414400 | 0.3295000 | 0.3182300 | 0.3075900 | 0.2975700 | 0.2881200 |
| 20000 | 0.3467100 | 0.3350000 | 0.3239200 | 0.3134600 | 0.3035800 | 0.2942400 |
| 21000 | 0.3517000 | 0.3402000 | 0.3293100 | 0.3190100 | 0.3092700 | 0.3000500 |
| 22000 | 0.3564500 | 0.3451500 | 0.3344400 | 0.3242900 | 0.3146800 | 0.3055700 |
| 23000 | 0.3609700 | 0.3498600 | 0.3393100 | 0.3293100 | 0.3198300 | 0.3108300 |
| 24000 | 0.3652900 | 0.3543500 | 0.3439700 | 0.3341000 | 0.3247400 | 0.3158500 |
| 25000 | 0.3694300 | 0.3586600 | 0.3484200 | 0.3386900 | 0.3294500 | 0.3206600 |
| 26000 | 0.3734000 | 0.3627900 | 0.3526900 | 0.3430900 | 0.3339500 | 0.3252600 |
| 27000 | 0.3772200 | 0.3667500 | 0.3567900 | 0.3473100 | 0.3382800 | 0.3296900 |
| 28000 | 0.3808900 | 0.3705700 | 0.3607400 | 0.3513700 | 0.3424500 | 0.3339500 |
| 29000 | 0.3844400 | 0.3742500 | 0.3645400 | 0.3552900 | 0.3464600 | 0.3380500 |
| 30000 | 0.3878700 | 0.3778100 | 0.3682100 | 0.3590600 | 0.3503300 | 0.3420000 |

What is claimed is:

1. A method for determining a parameter of interest of a formation fluid, comprising:
   a. inserting a tool into a borehole in a formation;
   b. using the tool to measure a formation fluid refractive index, a formation fluid pressure and a formation fluid temperature;
   c. determining a refractive index of a reference fluid at the formation fluid pressure and the formation fluid temperature; and
   d. estimating the parameter of interest of the formation fluid from a comparison of the formation fluid refractive index and the reference fluid refractive index.

2. The method of claim 1, wherein the formation fluid is chosen from the group consisting of: a brine; and a natural gas.

3. The method of claim 1, wherein the parameter of interest is chosen from the group consisting of: a formation fluid resistivity; and a dryness of a natural gas.

4. The method of claim 1, wherein the reference fluid is chosen from the group consisting of: a substantially pure water; and a substantially pure methane gas.

5. The method of claim 1, wherein the formation fluid is a brine and the reference fluid is substantially pure water, and determining a formation fluid parameter of interest comprises:
   i. comparing the brine refractive index to the water refractive index to determine the salinity of the brine; and
   ii. using a first empirical model to determine brine resistivity from the brine salinity.

6. The method of claim 1, wherein the formation fluid is a natural gas and the reference fluid is substantially pure methane, and determining a formation fluid parameter of interest comprises comparing the natural gas refractive index to the methane refractive index to determine the dryness of the natural gas.

7. The method of claim 1, wherein the tool withdraws a sample from the formation.

8. The method of claim 1, wherein the tool comprises a controller having a processor and a memory, said processor adapted to operate under programmed instructions to determine the parameter of interest of the formation fluid from a comparison of the corresponding formation fluid density and the reference fluid density.

9. An apparatus for determining a formation fluid parameter of interest, comprising:
   a. a tool in a borehole, said tool adapted to determine a formation fluid refractive index, a formation fluid pressure and a formation fluid temperature; and
   b. a controller for determining a reference fluid refractive index acting under programmed instructions and having (i) a model of a reference fluid stored therein; and (ii) an empirical correlation stored in said controller, said correlation relating the formation parameter of interest to a comparison of said formation fluid refractive index to said reference fluid refractive index.

10. The apparatus of claim 9, wherein the formation fluid is chosen from the group consisting of: a brine; and a natural gas.

11. The apparatus of claim 9, wherein the parameter of interest is chosen from the group consisting of: a formation fluid resistivity; and a dryness of a natural gas.

12. The apparatus of claim 9, wherein the reference fluid is chosen from the group consisting of: a substantially pure water; and a substantially pure methane.

13. The apparatus of claim 9, wherein the formation fluid is a brine and the reference fluid is substantially pure water, and the model relates the comparison of the formation fluid refractive index to the reference fluid refractive index to determine a formation fluid salinity.

14. The system of claim 13, wherein the first empirical correlation relates the formation fluid salinity to formation fluid resistivity.

15. The apparatus of claim 9, wherein the formation fluid is a natural gas and the reference fluid is substantially pure methane, and the model relates the comparison of the formation fluid refractive index to the reference fluid refractive index to the dryness of the natural gas.

16. The apparatus of claim 9, wherein the tool withdraws a sample from the formation.

17. The apparatus of claim 9, wherein the tool comprises a controller having a processor and a memory, said processor adapted to operate under stored instructions to determine the parameter of interest of the formation fluid from a comparison of the corresponding formation fluid refractive index and the reference fluid refractive index.

18. The method of claim 1, wherein the step of determining a refractive index of a reference fluid comprises determining the refractive index of the reference fluid from the group consisting of: (i) choosing a value of refractive index of the reference fluid in a look-up table stored in the tool; and (ii) calculating a value of the refractive index from a second empirical model stored in the tool.

* * * * *